(12) United States Patent
Sheridon

(10) Patent No.: US 7,585,539 B2
(45) Date of Patent: Sep. 8, 2009

(54) METHODS OF TIGHTLY PACKING ELEMENTS IN AN ELECTRIC DISPLAY MEDIA

(75) Inventor: Nicholas K Sheridon, Los Altos, CA (US)

(73) Assignee: Xerox Corporation, Norwalk, CT (US)

( * ) Notice: Subject to any disclaimer, the term of this patent is extended or adjusted under 35 U.S.C. 154(b) by 730 days.

(21) Appl. No.: 11/215,228

(22) Filed: Aug. 31, 2005

(65) Prior Publication Data

US 2007/0047064 A1 Mar. 1, 2007

(51) Int. Cl.
*B05D 5/12* (2006.01)
(52) U.S. Cl. .................................................. 427/58
(58) Field of Classification Search ............. 428/211.1, 428/411.1, 537.5; 156/500
See application file for complete search history.

(56) References Cited

U.S. PATENT DOCUMENTS

| | | | |
|---|---|---|---|
| 3,532,932 A * | 10/1970 | Simon ........................ 361/220 |
| 5,389,945 A | 2/1995 | Sheridon |
| 5,604,027 A * | 2/1997 | Sheridon ..................... 428/323 |
| 5,723,204 A | 3/1998 | Stefik |
| 6,383,619 B1 * | 5/2002 | Engler et al. ................. 428/212 |
| 6,517,618 B2 * | 2/2003 | Foucher et al. ........... 106/31.16 |
| 6,518,949 B2 | 2/2003 | Drzaic |
| 6,542,283 B1 * | 4/2003 | Sheridon ..................... 359/296 |
| 7,394,509 B2 * | 7/2008 | Sage ............................. 349/86 |
| 2002/0185216 A1 * | 12/2002 | Biegelsen et al. ........... 156/245 |
| 2004/0202862 A1 * | 10/2004 | Kazmaier et al. ........... 428/403 |
| 2004/0254322 A1 * | 12/2004 | Trent et al. ................ 526/348.1 |

* cited by examiner

*Primary Examiner*—Michael Cleveland
*Assistant Examiner*—Tabassom Tadayyon Eslami
(74) *Attorney, Agent, or Firm*—Pillsbury Winthrop Shaw Pittman LLP

(57) ABSTRACT

A method of tightly packing display elements in an electric display. The method involves increasing the density of display elements of an electronic display, such as rotatable elements in electronic paper, in order to increase the brightness and/or sharpness of the display.

15 Claims, 3 Drawing Sheets

METHODS OF TIGHTLY PACKING ELEMENTS IN AN ELECTRIC DISPLAY MEDIA

BACKGROUND

Disclosed is a method of tightly packing display elements in an electric display. The method involves increasing the density of display elements of an electronic display, such as rotatable elements in electronic paper, in order to increase the brightness and/or sharpness of the display.

Traditional signs have been based upon printed materials, paper, plastic, metal, etc., and are therefore not programmable. Accordingly, they are not easily changed. In an attempt to overcome this problem, electronically programmable and/or controllable signs have been in existence for many years. For example, liquid crystal diode (LCD) displays, cathode ray tube (CRT) displays, and other electrically-addressable displays will display an image in response to applied electric signals or fields. However, such signs typically require a large amount of electricity, since they must provide illumination in order to be visible to a viewer.

Various types of electric writeable media, some of which are commonly known as rotatable element displays or electric paper displays, also exist in the prior art. One example of a rotatable element display includes a polymer substrate and bichromal rotatable elements such as balls or cylinders that are in suspension with an enabling fluid and-are one color, such as white, on one side and a different color, such as black, on the other. Examples of such rotatable element displays are described in U.S. Pat. No. 5,723,204 to Stefik and U.S. Pat. No. 5,604,027 to Sheridon, each of which is incorporated herein by reference in its entirety. Under the influence of an electric field, the elements rotate so that either the white side or the black side is exposed.

Another type of electric writeable media is known as an electronic ink display, such as the one described in U.S. Pat. No. 6,518,949 to Drzaic, which is incorporated herein by reference. An electronic ink display includes at least one capsule filled with a plurality of particles, made of a material such as titania, and a dyed suspending fluid. When a direct-current electric field of an appropriate polarity is applied across the capsule, the particles move to a viewed surface of the display and scatter light. When the applied electric field is reversed, the particles move to the rear surface of the display and the viewed surface of the display then appears dark.

Yet another type of electric writeable media, also described in U.S. Pat. No. 6,518,949 to Drzaic, includes a first set of particles and a second set of particles in a capsule. The first set of particles and the second set of particles have contrasting optical properties, such as contrasting colors, and can have, for example, differing electrophoretic properties. The capsule also contains a substantially clear fluid. The capsule has electrodes disposed adjacent to it connected to a voltage source, which may provide an alternating-current field or a direct-current field to the capsule. Upon application of an electric field across the electrodes, the first set of particles move toward one electrode, while the second set of particles move toward the second electrode.

Rotatable element displays have numerous advantages over conventional displays, such as LCDs and CRTs, since they are suitable for viewing in ambient light, they retain an image indefinitely in the absence of an applied electric field, and they can be made to be very lightweight and/or flexible. For further advantages of such displays, see U.S. Pat. No. 5,389,945 to Sheridon, incorporated herein by reference in its entirety. An example of such a display is a SmartPaper™ display from Gyricon LLC.

One disadvantage of prior art electric paper displays is that they are generally not as bright as LCD or CRT displays. This is at least in part because the current techniques used to place changing elements in electric paper displays do not pack the elements sufficiently close to adjacent elements. When changing elements are placed in an electric paper display, electric charges placed on the elements tend to repel the elements from adjacent elements. Tight element packing has been shown to be necessary for high brightness of an electric paper display.

A slurry coating technique is used to place elements in electric paper. The technique starts by dispersing changing elements, such as bichromal beads, in an uncured elastomer to form a slurry. The slurry, which is approximately 50% bichromal beads and 50% elastomer by weight, is then applied to a release substrate with the use of an applicator known as a "doctor blade." Heat is applied to the elastomer/bichromal bead coating in order to cure the coating. Subsequently, the heated slurry is pulled from the surface of the release substrate.

This technique has substantial limitations relating to the viscosity of the slurry. In order to make slurry coatings, the viscosity of the slurry must be relatively low. However, the viscosity of the slurry is largely determined by the percentage of the slurry composed of bichromal beads. As such, the concentration of bichromal beads in the slurry is not high enough to guarantee tight bead packing in the exterior layers of the electric paper sheet.

As such, a need exists to improve electric paper by creating methods of more closely packing rotatable elements in electric paper to improve the brightness of the paper and to allow for easier viewing.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "rotatable element" is a reference to one or more rotatable elements and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

Described herein are methods for increasing the density of rotatable elements in electronic paper in order to increase the brightness and/or visual sharpness of the paper.

In an embodiment, a method of making electric paper with tightly packed rotatable elements includes placing a first elastomer layer on top of a release substrate, placing a roughly uniform density of rotatable elements in the first elastomer layer, depositing ions on the upper surfaces of the rotatable elements, grounding the release substrate, heating the first elastomer layer and release substrate to partially cure the first elastomer layer, placing a second elastomer layer on top of the partially cured first elastomer layer, and curing the first and second elastomer layers. In an embodiment, the first elastomer layer may be from about 0.5 to about 4 mils thick, for example, approximately 2 mils thick. In an embodiment, heating the first elastomer layer includes applying sufficient heat to bring the first elastomer layer to a temperature of from about 60 to about 90 degrees Celsius for about 1 to about 4 minutes, for example, about 80 degrees Celsius for approximately 2 minutes. In an embodiment, curing the first and second elastomer layers includes applying sufficient heat to bring the first and second elastomer layers to a temperature of from about 60 degrees Celsius to about 110 degrees Celsius, for example, about 90 degrees Celsius for approximately 2 hours.

In an embodiment, a method of making electric paper with tightly packed rotatable elements includes placing a first elastomer layer on top of a release substrate, placing a roughly uniform density of rotatable elements in the first elastomer layer, rolling one or more rollers over the rotatable elements, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed rotatable elements includes placing a first elastomer layer on top of a release substrate, placing a roughly uniform density of rotatable elements comprising a superparamagnetic material in the elastomer layer, applying a magnetic field gradient to attract the rotatable elements toward the release substrate, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed rotatable elements includes placing a first elastomer layer on top of a release substrate, placing a roughly uniform density of rotatable elements in the first elastomer layer, placing a plurality of metal beads on top of the rotatable elements, applying a magnetic field gradient to attract the metal beads toward the release substrate, heating the first elastomer layer and release substrate to partially cure the first elastomer layer, removing the plurality of metal beads, placing a second elastomer layer on top of the partially cured first elastomer layer, and curing the first and second elastomer layers.

In an embodiment, a method of making electric paper with tightly packed rotatable elements includes placing a first elastomer layer on top of a release substrate, placing a roughly uniform density of rotatable elements in the first elastomer layer, centrifuging the release substrate to cause the rotatable elements to be drawn towards the release substrate, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed rotatable elements includes placing a first elastomer layer on top of a release substrate, placing a roughly uniform density of rotatable elements in the first elastomer layer, applying an electric field of the proper polarity to attract the rotatable elements towards the release substrate, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed capsules includes placing a first elastomer layer on top of a release substrate, placing a roughly uniform density of capsules containing one or more changing elements in a multichromal media in the first elastomer layer, depositing ions on the upper surfaces of the capsules, grounding the release substrate, heating the first elastomer layer and release substrate to partially cure the first elastomer layer, placing a second elastomer layer on top of the partially cured first elastomer layer, and curing the first and second elastomer layers. In an embodiment, the first elastomer layer is approximately 2 mils thick. In an embodiment, the step of heating the first elastomer layer and release substrate includes applying sufficient heat to bring the first elastomer layer to a temperature of approximately 80 degrees Celsius for approximately 2 minutes. In an embodiment, the step of curing the first and second elastomer layers includes applying sufficient heat to bring the first and second elastomer layers to a temperature of approximately 90 degrees Celsius for approximately 2 hours.

In an embodiment, a method of making electric paper with tightly packed capsules includes placing a first elastomer layer on top of a release substrate, placing a roughly uniform density of capsules containing one or more changing elements in a multichromal media in the first elastomer layer, rolling one or more rollers over the capsules, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed capsules includes placing a first elastomer layer on top of a release substrate, placing a roughly uniform density of capsules, containing one or more changing elements in a multichromal media and a paramagnetic material, in the first elastomer layer, applying a magnetic field gradient to attract the capsules toward the release substrate, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed capsules including placing a first elastomer layer on top of a release substrate, placing a roughly uniform density of capsules containing one or more changing elements in a multichromal media in the first elastomer layer, placing a plurality of metal beads on top of the capsules, applying a magnetic field gradient to attract the metal beads toward the release substrate, heating the first elastomer layer and release substrate to partially cure the first elastomer layer, removing the plurality of metal beads, placing a second elastomer layer on top of the partially cured first elastomer layer, and curing the first and second elastomer layers.

In an embodiment, a method of making electric paper with tightly packed capsules includes placing a first elastomer layer on top of a release substrate, placing a roughly uniform density of capsules containing one or more changing elements in a multichromal media in the first elastomer layer, centrifuging the release substrate to cause the capsules to be drawn towards the release substrate, heating the first elastomer layer and release substrate to partially cure the first elastomer layer, placing a second elastomer layer on top of the partially cured first elastomer layer, and curing the first and second elastomer layers.

In an embodiment, a method of making electric paper with tightly packed capsules includes placing a first elastomer layer on top of a release substrate, placing a roughly uniform density of capsules containing one or more changing elements in a multichromal media in the first elastomer layer, applying an electric field of the proper polarity to attract the capsules towards the release substrate, heating the first elastomer layer and release substrate to partially cure the first elastomer layer, placing a second elastomer layer on top of the partially cured first elastomer layer, and curing the first and second elastomer layers.

BRIEF DESCRIPTION OF THE DRAWINGS

Aspects, features, benefits and advantages of embodiments of the present invention will be apparent with regard to the following description and the accompanying drawings where.

DETAILED DESCRIPTION

The present invention relates to methods for increasing the density of rotatable elements or other changing elements of a multichromal media in electronic paper in order to increase the brightness of the paper.

Figure 1:
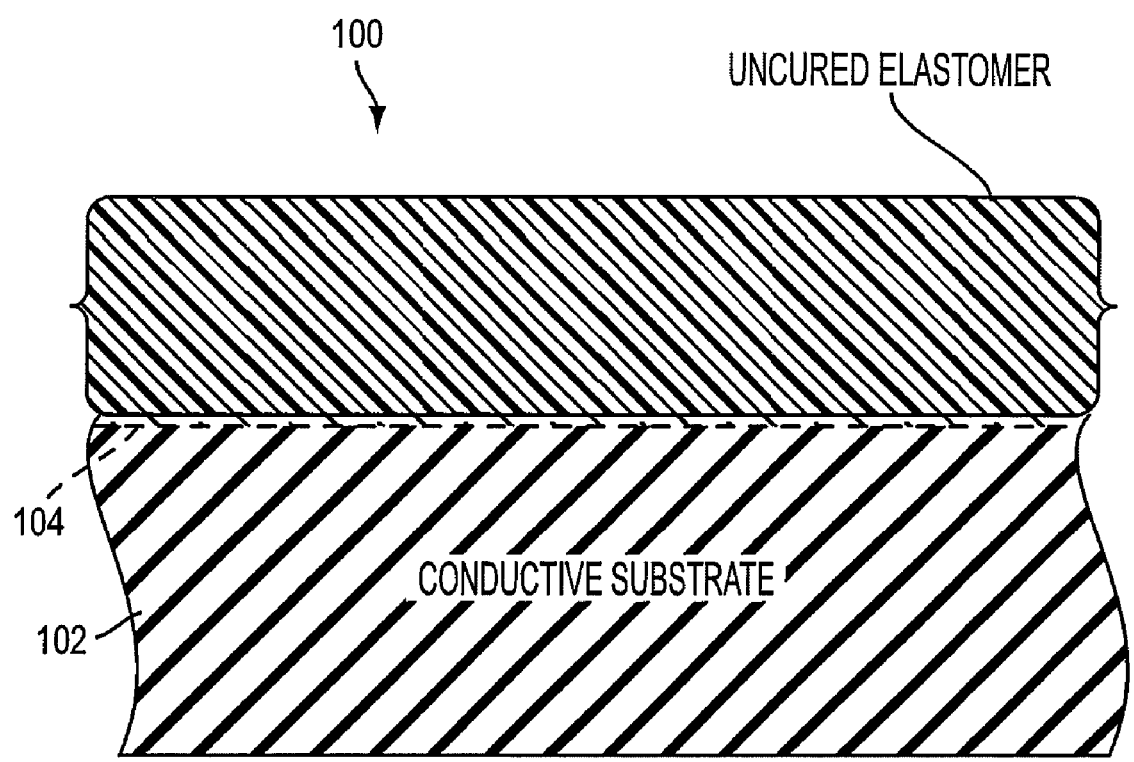
FIGS. 1-5 depict steps of exemplary methods of tightly packing changing elements for electric paper according to an description contained herein.

FIG. 1 depicts the first step of an exemplary method of tightly packing rotatable elements for electric paper according to an embodiment of the present invention. The first step in making sheets of electric paper 100 with tightly packed rotatable elements may include coating a release substrate 102 with a thin layer of a clear elastomer 104. The clear elastomer 104 may be applied to the substrate 102 using, for example, a doctor blade (not shown). Preferably, this layer is approximately 2 mils in thickness, although other thicknesses are within the scope of this invention.

Figure 2:
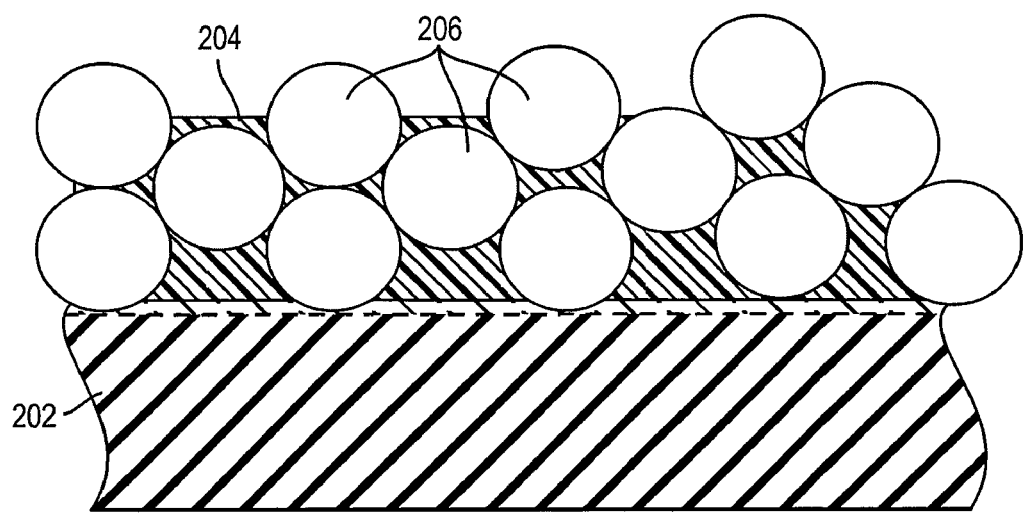

Rotatable elements 206 may then be placed on the elastomer-covered substrate 202 in a roughly uniform density, as shown in FIG. 2. The uncured elastomer 204 may wet the rotatable elements 206 and wick up into the rotatable elements to fill voids between adjacent rotatable elements. The elastomer 204 may maintain full wetting of the release substrate 202 during the placement of the rotatable elements 206. Because the elastomer 204 has a limited volume, the number of layers of rotatable elements 206 that are wetted may also be limited. Wetted rotatable elements 206 may be lightly adhered to the release substrate 202. After un-wetted rotatable elements are removed from the release substrate 202, the thickness of wetted elements 206 remaining may be substantially uniform.

Subsequently, the rotatable elements 206 are preferably closely packed together. Although numerous methods of packing rotatable elements 206 exist, five such methods will be described below. Other implementations based on these descriptions will be readily apparent to those of skill in the art.

EXAMPLE 1

Figure 3:
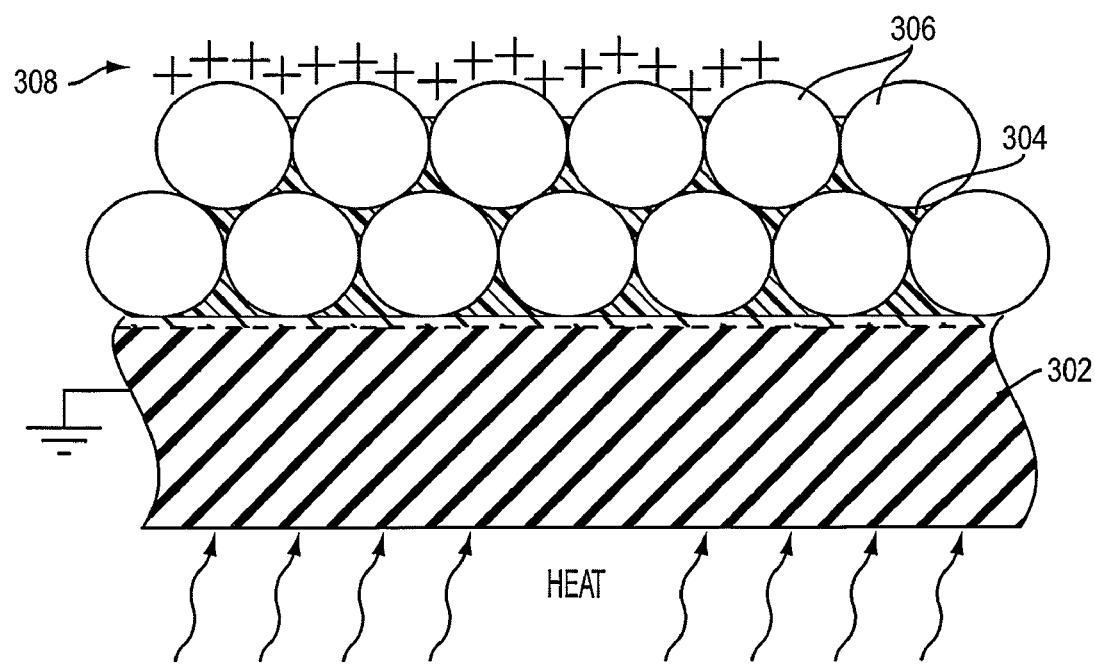

As shown in FIG. 3, ions from a scoratron 308 may be deposited on the upper surfaces of the rotatable elements 306 while the release substrate 302 is grounded. A scoratron 308 is a corona discharge device that has an electrically isolated screen. The voltage of the screen may be separately controlled. Ions from the corona discharge impact the rotatable elements 306 until the voltage potential of the elements is approximately equal to the voltage potential of the screen. Accordingly, the surface may be charged to an arbitrary potential. For example, without limitation, the scoratron screen may be operated at approximately 2000 volts. The ions deposited on the rotatable elements 306 may cause the elements to be strongly attracted to the grounded release substrate 302. As a result, the rotatable elements 306 may tightly pack together.

In an alternative embodiment, capsules containing changing elements of a multichromal media may replace the rotatable elements of FIG. 3. In this embodiment, the ions from the scoratron 308 are placed on the upper surface of the capsules causing the capsules to be drawn towards the grounded release substrate 302 and to tightly pack together.

One advantage of this approach is that very high electric fields can be achieved without electrical breakdown. The mechanical force associated with the high electric field drives the rotatable elements 306 toward the substrate. The result may be a significant increase in the packing density of the rotatable elements 306.

While ions are being placed on the rotatable elements 306, the release substrate 302 and the elastomer sheet 304 may be heated to partially cure the elastomer. In a preferred embodiment, the elastomer 304 is heated to approximately 80 degrees Celsius for a period of about 2 minutes. By partially curing the elastomer 304, the rotatable elements 306 may be locked in place while still permitting bonding of a second elastomer layer.

Figure 4:
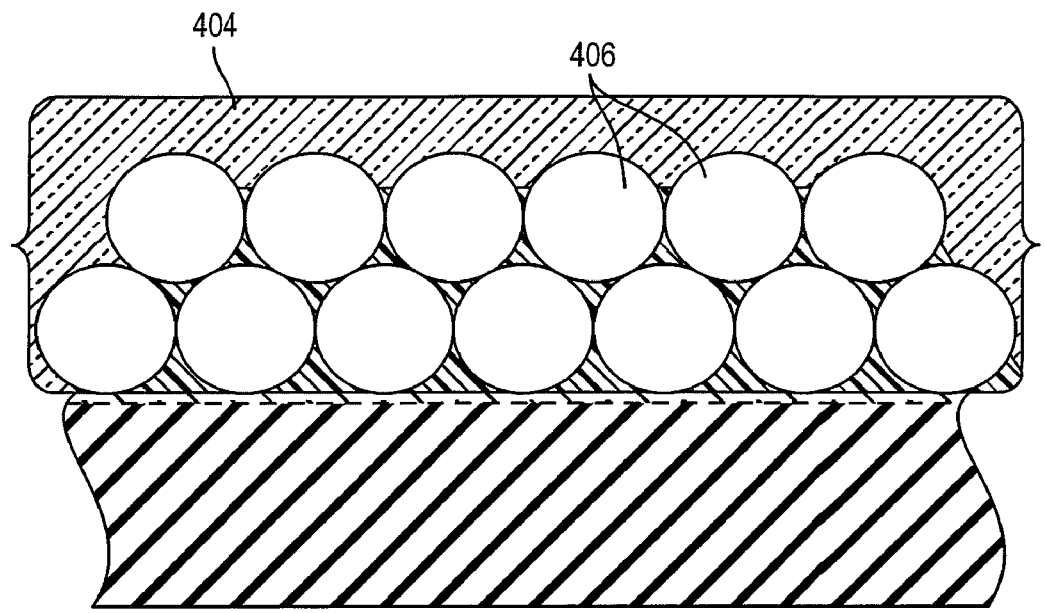
Figure 5:
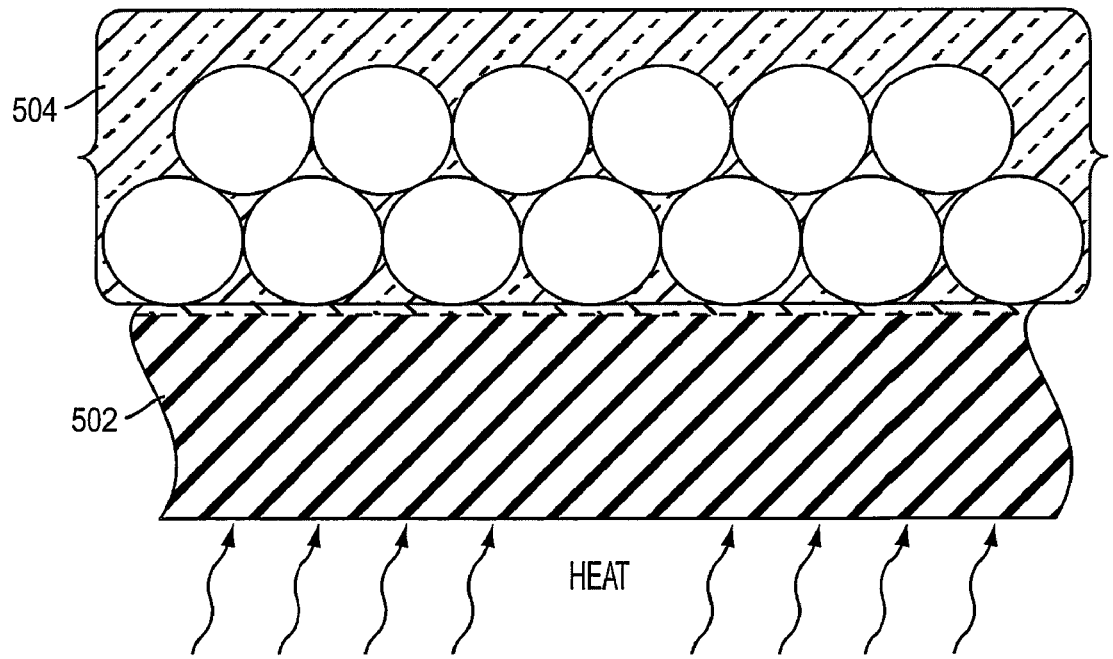

As shown in FIG. 4, the packed rotatable elements 406 may then be overcoated with another layer of clear elastomer 404. The entire structure may then be placed in an oven and the elastomer 504 may be fully cured, as shown in FIG. 5. In a preferred embodiment, the elastomer 504 may be cured at approximately 90 degrees Celsius for a period of about 2 hours. Because the first elastomer layer was only partially cured, curing the first and second layers in contact with each other causes the two layers to tightly bond. Finally, the cured electric paper may be removed from the oven and separated from the release substrate 502.

EXAMPLE 2

Extra layers of rotatable elements or capsules containing changing elements in a multichromal media may be placed on top of the wetted elements or capsules. The elastomer may then be rolled with rollers while the elastomer and the release substrate are heated. Preferably, the rollers may be made of soft rubber or a similar material. The elastomer layer may be heated so that it partially cures. Partial curing of the elastomer may hold the rotatable elements or capsules in place. Excess elements or capsules may be removed from the surface before adding a second layer of clear elastomer 404, as shown in FIG. 4. The entire structure may then be placed in an oven and the elastomer 504 may be fully cured, as shown in FIG. 5. In a preferred embodiment, the elastomer 504 may be cured at approximately 90 degrees Celsius for a period of about 2 hours. Because the first elastomer layer was only partially cured, curing the first and second layers in contact with each other causes the two layers to tightly bond. Finally, the cured electric paper may be removed from the oven and separated from the release substrate 502.

EXAMPLE 3

In an alternate embodiment, the rotatable elements or capsules containing changing elements in a multichromal media may be attracted in the direction of the release substrate by a strong magnetic field gradient if the elements include a material that has suitable magnetic properties. Alternatively, if the elements do not include such a material, a number of layers of small magnetic balls may be placed on top of the rotatable elements or capsules before exposing the structure to the magnetic field gradient. In either case, the elastomer and release substrate may then be heated to partially cure the elastomer and fix the rotatable elements or capsules in place. The magnetic balls, if any, may be removed once the elastomer is partially cured. At this point, a second layer of clear elastomer 404 may be placed on top of the rotatable elements or capsules, as shown in FIG. 4. The entire structure may then be placed in an oven and the elastomer 504 may be fully cured, as shown in FIG. 5. In a preferred embodiment, the elastomer 504 may be cured at approximately 90 degrees Celsius for a period of about 2 hours. Because the first elastomer layer was only partially cured, curing the first and second layers in contact with each other causes the two layers to tightly bond. Finally, the cured electric paper may be removed from the oven and separated from the release substrate 502.

EXAMPLE 4

In an alternate embodiment, the release substrate with either the elastomer/rotatable element layer or elastomer/ capsule containing changing elements in a multichromal media layer may be placed in a strong centrifuge. The motion of the centrifuge may cause the rotatable elements or capsules to tightly pack. While operating the centrifuge, the elastomer and release substrate may be heated to partially cure the elastomer and fix the rotatable elements or capsules in place. A second layer of clear elastomer 404 may be placed on top of the rotatable elements or capsules, as shown in FIG. 4. The entire structure may then be placed in an oven and the elastomer 504 may be fully cured, as shown in FIG. 5. In a preferred embodiment, the elastomer 504 may be cured at approximately 90 degrees Celsius for a period of about 2 hours. Because the first elastomer layer was only partially cured, curing the first and second layers in contact with each other causes the two layers to tightly bond. Finally, the cured electric paper may be removed from the oven and separated from the release substrate 502.

EXAMPLE 5

In an alternate embodiment, the rotatable elements or capsules may be packed together by placing an electrode on top of the elements capsules. The electrode may be used to generate a strong electric field of a proper polarity to attract the elements or capsules to the release substrate by interacting with the electrophoretic potential of the elements or capsules. During the application of the electric field, the elastomer and release substrate may be heated to partially cure the elastomer and fix the rotatable elements or capsules in place. A second layer of clear elastomer 404 may be placed on top of the rotatable elements, as shown in FIG. 4. The entire structure may then be placed in an oven and the elastomer 504 may be fully cured, as shown in FIG. 5. In a preferred embodiment, the elastomer 504 may be cured at approximately 90 degrees Celsius for a period of about 2 hours. Because the first elastomer layer was only partially cured, curing the first and second layers in contact with each other causes the two layers to tightly bond. Finally, the cured electric paper may be removed from the oven and separated from the release substrate 502.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

The invention claimed is:

1. A method of making electric paper with tightly packed switchable multi-chromal structures, comprising:
   placing a first elastomer layer on top of a release substrate;
   placing a roughly uniform density of switchable multi-chromal structures in the first elastomer layer;
   depositing ions on the upper surfaces of the switchable multi-chromal structures;
   grounding the release substrate to attract the multi-chromal structures toward the grounded release substrate;
   heating the first elastomer layer and release substrate to partially cure the first elastomer layer while the release substrate is grounded;
   placing a second elastomer layer on top of the partially cured first elastomer layer; and
   curing the first and second elastomer layers.

2. The method of claim 1 wherein the first elastomer layer is approximately 2 mils thick.

3. The method of claim 1 wherein the step of heating the first elastomer layer and release substrate includes applying sufficient heat to bring the first elastomer layer to a temperature of approximately 80 degrees Celsius for approximately 2 minutes.

4. The method of claim 1 wherein the step of curing the first and second elastomer layers includes applying sufficient heat to bring the first and second elastomer layers to a temperature of approximately 90 degrees Celsius for approximately 2 hours.

5. A method according to claim 1, wherein the switchable multi-chromal structures are rotatable elements, the rotatable elements being received individually in cavities in the elastomer layer.

6. A method according to claim 1, wherein the switchable multi-chromal structures are capsules, each capsule comprising one or more changing elements.

7. A method of making electric paper with tightly packed switchable multi-chromal structures, comprising: placing a first elastomer layer on top of a release substrate; placing a roughly uniform density of switchable multi-chromal structures in the first elastomer layer, wherein each of the switchable multi-chromal structures includes a super-paramagnetic material; applying a magnetic field gradient to attract and pull the switchable multi-chromal structures toward the release substrate; heating the first elastomer layer and release substrate to partially cure the first elastomer layer; placing a second elastomer layer on top of the partially cured first elastomer layer; and curing the first and second elastomer layers.

8. A method according to claim 7, wherein the switchable multi-chromal structures are rotatable elements, the rotatable elements being received individually in cavities in the elastomer layer.

9. A method according to claim 7, wherein the switchable multi-chromal structures are capsules, each capsule comprising one or more changing elements.

10. A method of making electric paper with tightly packed switchable multi-chromal structures, comprising:
placing a first elastomer layer on top of a release substrate;
placing a roughly uniform density of switchable multi-chromal structures in the first elastomer layer;
placing a plurality of metal beads on top of the switchable multi-chromal structures;
applying a magnetic field gradient to attract the metal beads toward the release substrate;
heating the first elastomer layer and release substrate to partially cure the first elastomer layer while the magnetic field gradient is applied;
removing the plurality of metal beads;
placing a second elastomer layer on top of the partially cured first elastomer layer; and
curing the first and second elastomer layers.

11. A method according to claim 10, wherein the switchable multi-chromal structures are rotatable elements, the rotatable elements being received individually in cavities in the elastomer layer.

12. A method according to claim 10, wherein the switchable multi-chromal structures are capsules, each capsule comprising one or more changing elements.

13. A method of making electric paper with tightly packed switchable multi-chromal structures, comprising: placing a first elastomer layer on top of a release substrate; placing a roughly uniform density of switchable multi-chromal structures in the first elastomer layer; applying an electric field of the proper polarity to attract and pull the switchable multi-chromal structures towards the release substrate; heating the first elastomer layer and release substrate to partially cure the first elastomer layer; placing a second elastomer layer on top of the partially cured first elastomer layer; and curing the first and second elastomer layers.

14. A method according to claim 13, wherein the switchable multi-chromal structures are rotatable elements, the rotatable elements being received individually in cavities in the elastomer layer.

15. A method according to claim 13, wherein the switchable multi-chromal structures are capsules, each capsule comprising one or more changing elements.

* * * * *